(12) United States Patent
Sung et al.

(10) Patent No.: US 10,855,386 B1
(45) Date of Patent: Dec. 1, 2020

(54) VEHICLE INFOTAINMENT APPARATUS AND METHOD FOR CONTROLLING THE SAME

(71) Applicants: Hyundai Motor Company, Seoul (KR); Kia Motors Corporation, Seoul (KR)

(72) Inventors: Jihoon Sung, Seoul (KR); Jaekyu Yu, Hwaseong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/831,488

(22) Filed: Mar. 26, 2020

(30) Foreign Application Priority Data

Aug. 6, 2019 (KR) .................. 10-2019-0095496

(51) Int. Cl.
*H04H 40/00* (2009.01)
*H04B 1/06* (2006.01)
*H04H 40/45* (2008.01)
*H04B 1/16* (2006.01)

(52) U.S. Cl.
CPC .............. *H04H 40/45* (2013.01); *H04B 1/16* (2013.01)

(58) Field of Classification Search
CPC ........... H04W 4/06; H04W 4/40; H04W 4/44; H04W 4/48; H04W 52/0229; H04W 72/005; H04B 1/16; H04B 1/3827; H04B 7/0632; H04B 17/309; H04B 17/318; H04H 20/22; H04H 20/62; H04H 20/71; H04H 60/51; H04H 60/58; H04H 60/64; H04M 1/6091; H04M 1/72563; H04L 65/4076; H03G 3/32; H03G 3/344; H03G 5/025; H03G 5/165; G06F 3/165

See application file for complete search history.

(56) References Cited

U.S. PATENT DOCUMENTS

| | | | | |
|---|---|---|---|---|
| 7,406,302 B1* | 7/2008 | Lou | ..................... | H04B 1/1669 455/226.4 |
| 7,447,488 B2* | 11/2008 | Howard | ................ | H04H 20/34 455/150.1 |
| 8,769,587 B2* | 7/2014 | Lee | ........................ | H04H 60/51 455/3.06 |
| 9,154,872 B2* | 10/2015 | Muench | .................. | H04R 5/04 |
| 9,819,312 B2* | 11/2017 | Namekawa | ............... | H03F 3/20 |
| 9,831,966 B2* | 11/2017 | Tuli | ....................... | H04H 20/24 |
| 2007/0288517 A1* | 12/2007 | Takatsuka | .......... | H04N 21/8113 |
| 2012/0201387 A1* | 8/2012 | Matsuda | ................ | H04H 40/72 381/3 |
| 2014/0018006 A1* | 1/2014 | Petrucci | ................ | H04H 20/62 455/66.1 |

* cited by examiner

*Primary Examiner* — Quochien B Vuong
(74) *Attorney, Agent, or Firm* — Morgan, Lewis & Bockius LLP (57) ABSTRACT

A vehicle infotainment apparatus may include an antenna configured to receive a FM broadcast signal; an RF front end configured to modulate and demodulate the FM broadcast signal; and a controller configured to determine a type of content being broadcast by processing the FM broadcast signal, determine a reference level for switching a sound mode based on the determined type of the content, determine the sound mode based on the reference level and the level of the FM broadcast signal, and control the RF front end to modulate and demodulate the FM broadcast signal based on the determined sound mode.

24 Claims, 6 Drawing Sheets

| Version | Block 1 : 26bits | | Block 2 : 26bits | | | | | | | | Block 3 : 26bits | | Block 4 : 26bits | | |
|---|---|---|---|---|---|---|---|---|---|---|---|---|---|---|---|
| Block Internal | PI Code | Check + Offset A | GTYPE | B0 | TP | PTY | TA | M/S | DI | C1 C0 | Check + Offset B | PI Code | Check + Offset C | Character A | Character B | Check + Offset D |
| Bit Value | 16bits | | 0000 | 1 | X | XXXX | X | X | X | X X | | 16bits | | 8 bit char | 8 bit char | |

<RDS DATE>

VEHICLE INFOTAINMENT APPARATUS AND METHOD FOR CONTROLLING THE SAME

CROSS-REFERENCE TO RELATED APPLICATION

The present application claims priority to Korean Patent Application No. 10-2019-0095496, filed on Aug. 6, 2019, the entire contents of which is incorporated herein for all purposes by this reference.

BACKGROUND OF THE INVENTION

Field of the Invention

The present invention relates to a vehicle infotainment apparatus capable of switching a sound mode to stereo or mono according to the type of content being broadcast, and a method for controlling the same.

Description of Related Art

The vehicle is provided with an infotainment apparatus of receiving a broadcast such as radio broadcast. The FM broadcast signal received by the infotainment apparatus is transmitted through a specific frequency. The infotainment apparatus may adjust the sound mode to improve the quality of the received broadcast signal. For example, the infotainment apparatus can adjust the sound mode to stereo or mono.

However, the related art has changed the sound mode to mono to remove background noise when the level of the FM broadcast signal is lower than a predetermined value without considering the type of content being broadcast. In the instant case, there is a problem that the sense of space of the sound output through the speaker is removed more than necessary.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle infotainment apparatus configured for switching the sound mode to stereo or mono according to the type of content being broadcast, and a method for controlling the same.

Various aspects of the present invention are directed to providing a vehicle infotainment apparatus that can prevent the sound space from being removed more than necessary by appropriately switching the sound mode according to the type of content being broadcast, and provide a better listening experience to the user, and a method for controlling the same.

In accordance with an aspect of the present invention, a vehicle infotainment apparatus includes: an antenna configured to receive a FM broadcast signal; an RF front end configured to modulate and demodulate the FM broadcast signal; and a controller configured to determine a type of content being broadcast by processing the FM broadcast signal, determine a reference level for switching a sound mode based on the determined type of the content, determine the sound mode based on the reference level and the level of the FM broadcast signal, and control the RF front end to modulate and demodulate the FM broadcast signal based on the determined sound mode.

The controller is configured to determine the sound mode to stereo when the level of the FM broadcast signal is greater than the reference level and determine the sound mode to mono when the level of the FM broadcast signal is lower than or equal to the reference level.

The controller is configured to determine the reference level as a first reference level when the type of content is music and determine the sound mode based on the first reference level and the level of the FM broadcast signal.

The controller is configured to determine the reference level as a second reference level higher than a first reference level when the type of content is voice or radio commercial and determine the sound mode based on the second reference level and the level of the FM broadcast signal;

The controller is configured to detect a phase difference between a left channel and a right channel from the FM broadcast signal and determine the type of the content based on the phase difference.

The controller is configured to determine the type of the content as music when the phase difference is equal to or greater than a reference phase value and determine the type of the content as voice or radio commercial when the phase difference is lower than the reference phase value.

The controller is configured to determine the type of the content based on Radio Data System (RDS) data received through the antenna.

The controller is configured to determine the type of the content based on the M/S bits included in the RDS data.

The controller is configured to determine the type of the content as music when the M/S bit is 1 and determine the type of the content as voice or radio commercial when the M/S bit is 0.

The vehicle infotainment apparatus may further include a transceiver configured to communicate with an external data center, wherein the controller is configured to acquire information related to the content being broadcast from the external data center.

The vehicle infotainment apparatus may further include a user interface device, wherein the controller is configured to determine a type of the content based on feedback of a user input through the user interface device.

The vehicle infotainment apparatus may further include a memory configured to store broadcast information for each time corresponding to the FM broadcast frequency, wherein the controller is configured to determine a type of the content based on the broadcast information for each time.

In accordance with an aspect of the present invention, a method for controlling a vehicle infotainment apparatus includes: receiving a FM broadcast signal using an antenna of the vehicle infotainment apparatus; determining a type of content being broadcast by processing the FM broadcast signal; determining a reference level for switching a sound mode based on the determined type of the content; determining the sound mode based on the reference level and the level of the FM broadcast signal; and controlling the RF front end to modulate and demodulate the FM broadcast signal based on the determined sound mode.

The determining the sound mode includes: determining the sound mode to stereo when the level of the FM broadcast signal is greater than the reference level; and determining the sound mode to mono when the level of the FM broadcast signal is lower than or equal to the reference level.

The determining the reference level includes: determining the reference level as a first reference level when the type of content is music, wherein the determining the sound mode includes: determining the sound mode based on the first reference level and the level of the FM broadcast signal.

The determining the reference level includes: determining the reference level as a second reference level higher than a first reference level when the type of content is voice or radio commercial, wherein the determining the sound mode includes: determining the sound mode based on the second reference level and the level of the FM broadcast signal.

The determining the type of content includes: detecting a phase difference between a left channel and a right channel from the FM broadcast signal; and determining the type of the content based on the phase difference.

The determining the type of content includes: determining the type of the content as music when the phase difference is equal to or greater than a reference phase value; and determining the type of the content as voice or radio commercial when the phase difference is lower than the reference phase value.

The determining the type of content includes: determining the type of the content based on Radio Data System (RDS) data received through the antenna.

The determining the type of content includes: determining the type of the content based on the M/S bits included in the RDS data.

The determining the type of content includes: determining the type of the content as music when the M/S bit is 1; and determining the type of the content as voice or radio commercial when the M/S bit is 0.

The method may further include acquiring information related to the content being broadcast from an external data center.

The determining the type of content includes: determining a type of the content based on feedback of a user input through a user interface device.

The determining the type of content includes: determining a type of the content based on the broadcast information for each time corresponding to the FM broadcast frequency stored in a memory.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of embodiments of the present invention will be described, and description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it may be directly or indirectly connected to the other element, wherein the indirect connection includes "connection" via a wireless communication network.

Furthermore, when a part "includes" or "comprises" an element, unless there is a particular description contrary thereto, the part may further include other elements, not excluding the other elements.

It will be understood that, although the terms first, second, third, etc., may be used herein to describe various elements, it may not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the present invention will be described with reference to the accompanying drawings.

Figure 1:
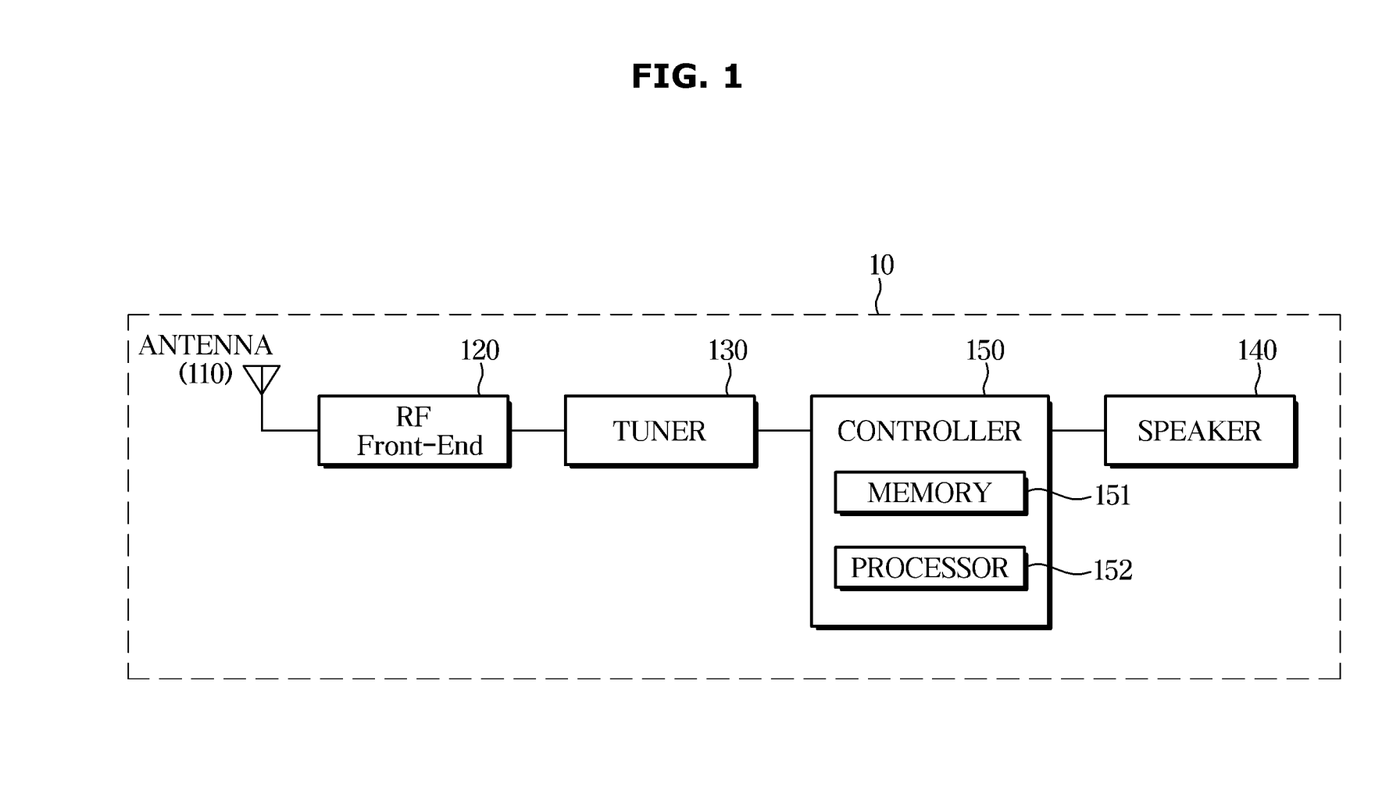
FIG. 1 illustrates a configuration of a vehicle infotainment apparatus according to an exemplary embodiment of the present invention.

FIG. 1 illustrates a configuration of a vehicle infotainment apparatus according to an exemplary embodiment of the present invention.

Referring to FIG. 1, a vehicle infotainment apparatus 10 according to an exemplary embodiment of the present invention may include an antenna 110, an RF front end 120, a tuner 130, a speaker 140, and a controller 150.

The antenna 110 may receive a broadcast signal such as an FM broadcast signal, an AM broadcast signal, a TV broadcast signal, a DMB broadcast signal, etc., transmitted from a broadcasting station, and an interference signal introduced from a surrounding environment. Hereinafter, it is assumed that the antenna 110 receives an FM broadcast signal.

FM broadcasting utilizes frequency modulation. FM broadcasts have the advantage of being clearer and less affected by weather conditions than AM broadcasts. There are only about 20 channels of AM broadcasts, but FM broadcasts may have more than 100 channels using many frequencies.

FM stereo broadcast is a method of sending FM broadcasts in two signals at the same time. The stereoscopic reproduction effect may be achieved by use of a wide radio wave width which is an advantage of the Very High Frequency (VHF) frequency. FM stereo broadcasting mainly utilizes pilot tone system (AM-FM stereo). In the pilot tone system, the sum signal (L+R) and the difference signal (L-R) of the left (L) channel signal and the right (R) channel signal are contained in one radio wave. The bandwidth of the sum signal (L+R) transmitted in mono sound is 0-15 KHz. The bandwidth of the difference signal (L-R) transmitted as stereo sound is 23 to 53 kHz, where the L signal and the R signal are included at 23 to 38 kHz and 38 to 53 kHz, respectively. In the middle 19 kHz band, the pilot signal used for examination is located. The left (L) channel and the right (R) channel of the stereo sound have different sound information.

The RF front end 120 refers to a circuit provided between the antenna 110 and the tuner 130. The RF front end 120 may process a signal input through the antenna 110 and transmit the processed signal to the tuner 130. The RF front end 120 may include a band pass filter for blocking a signal outside a predetermined frequency band an RF amplifier for amplifying the weakened signal while passing through a band pass filter. The RF front end 120 includes an RF receiver and may modulate and demodulate the FM broadcast signal according to the control of the controller 150.

The tuner 130 may detect a signal of a listening channel. The tuner 130 may detect a frequency of a channel that the user wants to listen to. The user may select a channel that the user wants to listen to by operating a user interface device such as a dial provided in a head unit of the vehicle. The tuner 130 may detect a frequency of a selected channel according to a user input and receive only a signal of the selected channel frequency.

The speaker 140 is a device that converts an electroacoustic signal into sound waves. The controller 150 may control the RF front end 120 to modulate and demodulate the FM broadcast signal, and control the speaker 140 to output sound waves.

The controller 150 may refer to an electronic control unit (ECU) configured for controlling various components included in the vehicle infotainment apparatus 10.

The controller 150 includes a memory 151 that memorizes/stores programs, instructions, and data for controlling the operation of the vehicle 10 and a processor 152 for generating a control signal for controlling the operation of the infotainment apparatus 10 based on programs, instructions, and data stored/memorized in the memory 151. The processor 152 may include a digital processor for processing data of various sensors and a micro control unit (MCU) for generating control signals. The processor 152 and the memory 151 may be implemented as separate chips or as a single chip. Furthermore, the controller 150 may include a plurality of processors 152 and a plurality of memories 151.

The processor 152 may include logic circuits and arithmetic circuits, process data according to programs and/or instructions provided from the memory 151, and generate control signals according to processing results. The processor 152 may be electrically connected to various devices included in the infotainment apparatus 10. Furthermore, the processor 152 is electrically connected to the memory 151.

The memory 151 may include not only volatile memory such as S-RAM and D-RAM, but also nonvolatile memory such as flash memory, ROM, EPROM, and the like.

The memory 151 may store at least one instruction set to determine the type of content being broadcast by processing the FM broadcast signal, determine a reference level for switching the sound mode based on the type of content, determine a sound mode based on the reference level and the level of the FM broadcast signal and control the speaker based on the determined sound mode. The level of the signal may mean a voltage value of the signal.

Furthermore, the infotainment apparatus 10 according to an exemplary embodiment of the present invention may further include a transceiver for communicating with an external data center. The controller 150 may acquire information related to content being broadcast from an external data center. The controller 150 may determine the type of content which is being broadcast, based on the acquired information related to the content.

Furthermore, the infotainment apparatus 10 according to an exemplary embodiment of the present invention may further include a user interface device. The controller 150 may determine the type of content based on the user's feedback input through the user interface device.

Figure 2:
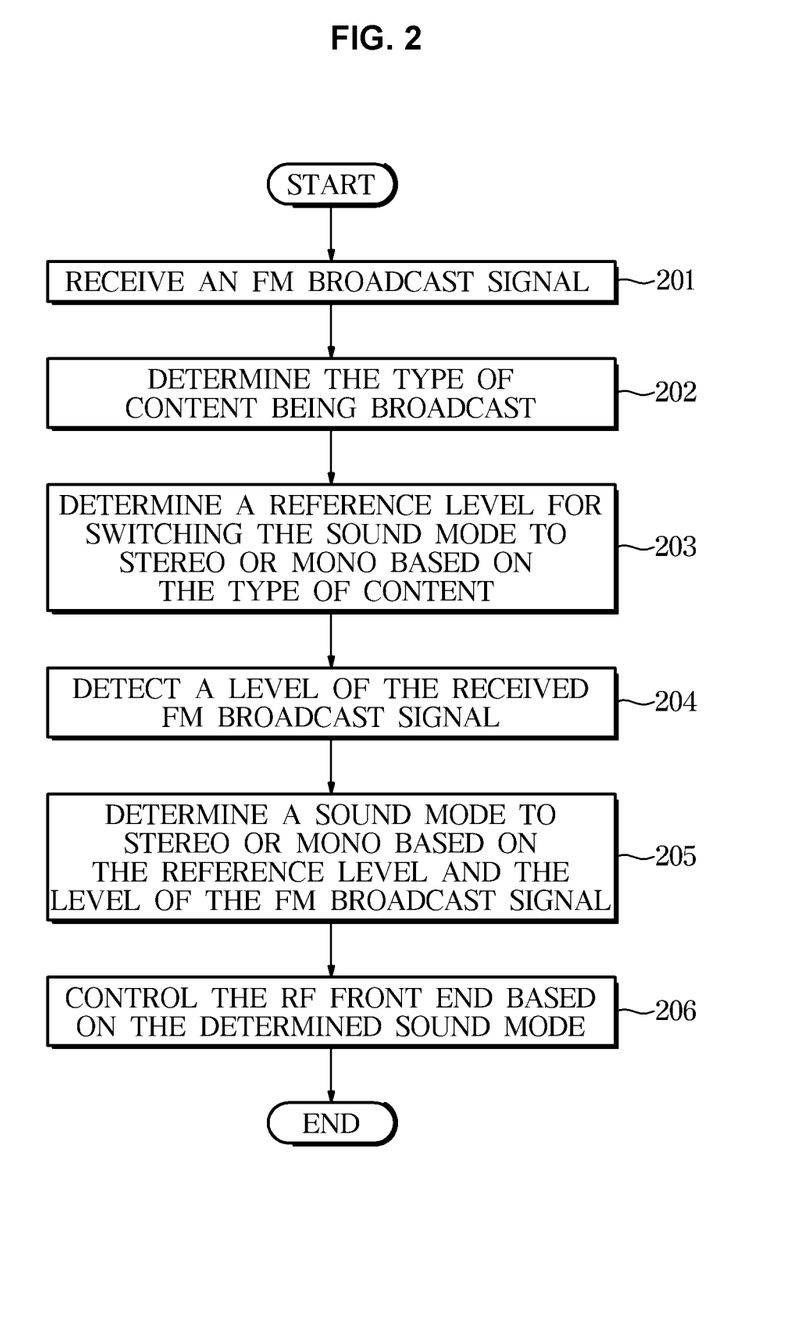
FIG. 2 is a flowchart illustrating a method for controlling a vehicle infotainment apparatus according to an exemplary embodiment of the present invention.

FIG. 2 is a flowchart illustrating a method for controlling a vehicle infotainment apparatus according to an exemplary embodiment of the present invention.

Referring to FIG. 2, the antenna 110 of the infotainment apparatus 10 receives an FM broadcast signal (201). The controller 150 may determine the type of content being broadcast by processing the FM broadcast signal received through the antenna 110 (202). The controller 150 may determine a reference level for switching the sound mode based on the type of content. The sound mode may be switched to stereo or mono.

The controller 150 may detect the level of the FM broadcast signal (204) and determine a sound mode based on the reference level and the level of the FM broadcast signal (205). The level of the signal may mean a voltage value of the signal. In other words, the controller 150 may determine the sound mode to stereo or mono based on the reference level and the level of the FM broadcast signal. The controller 150 may determine the sound mode to stereo when the level of the FM broadcast signal is greater than the reference level, and may determine the sound mode to mono when the level of the FM broadcast signal is lower than or equal to the reference level.

The controller 150 may control the RF front end to modulate and demodulate the FM broadcast signal based on the determined sound mode (206). Furthermore, the controller 150 may control the speaker 140 to output modulated and demodulated sound waves.

Figure 3:
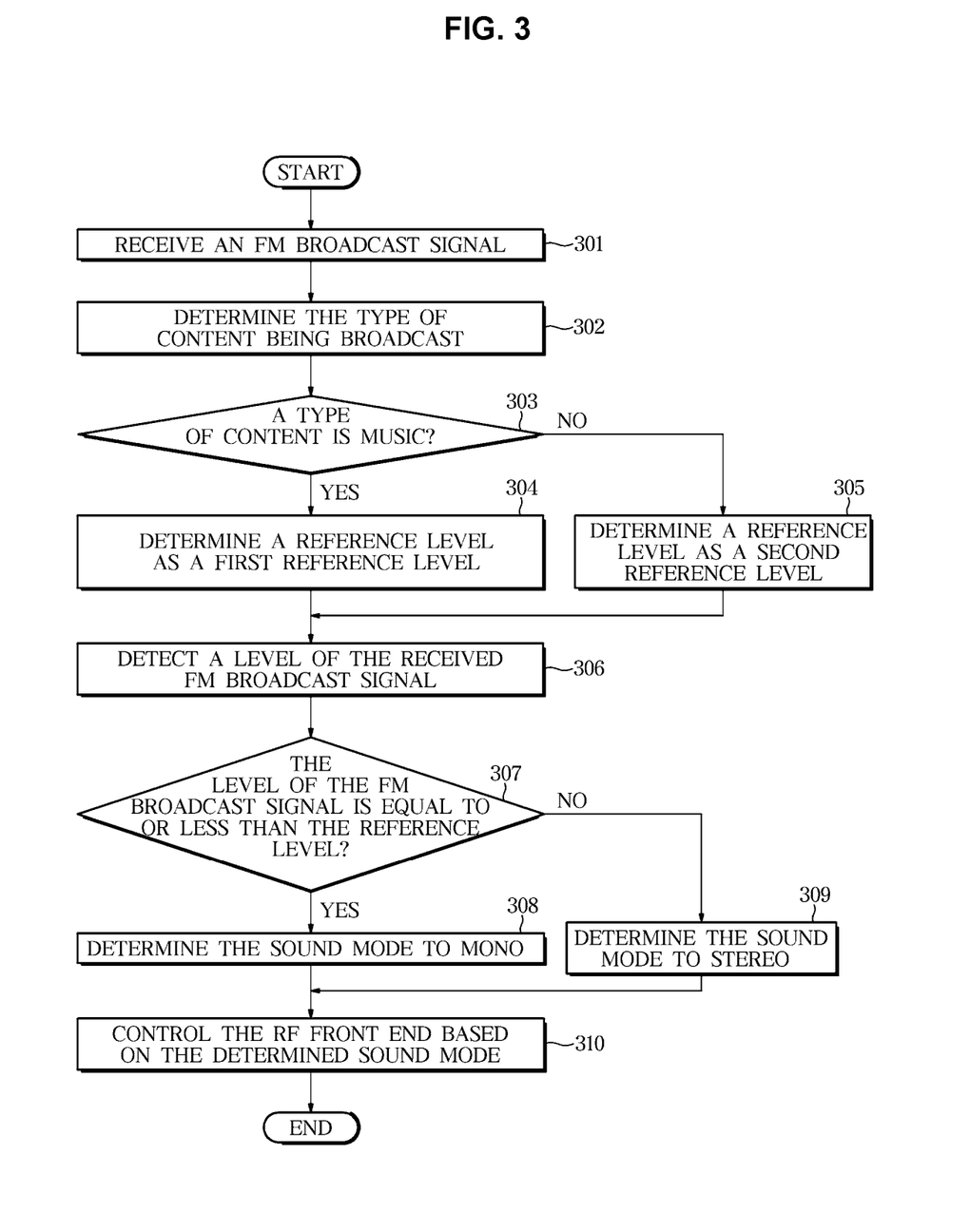
FIG. 3 is a flowchart illustrating a method for controlling a vehicle infotainment apparatus according to an exemplary embodiment in more detail.

FIG. 3 is a flowchart illustrating a method for controlling a vehicle infotainment apparatus according to an exemplary embodiment in more detail.

Referring to FIG. 3, the antenna 110 of the infotainment apparatus 10 receives an FM broadcast signal (301). The controller 150 may determine the type of content being broadcast by processing the FM broadcast signal received through the antenna 110 (302).

The controller 150 may detect a phase difference between the left (L) channel and the right (R) channel from the FM broadcast signal, and determine the type of content based on the phase difference. The controller 150 may determine the type of content as music when the phase difference is greater than or equal to the reference phase value, and determine the type of content as voice or radio commercial when the phase difference is lower than the reference phase value.

Furthermore, the controller 150 may determine the type of content based on Radio Data System (RDS) data received through the antenna 110. RDS data is described in detail in FIG. 6.

Furthermore, the memory 151 may store broadcast information for each time corresponding to the FM broadcast frequency. That is, predetermined broadcast schedule information may be stored in the memory 151 for each channel frequency of the FM broadcast. The broadcast information for each time includes information related to what is the content of a broadcast transmitted at a specific time. The controller 150 may determine the type of content based on broadcast information for each time stored in the memory 151.

Furthermore, the controller 150 may acquire the information related to the content being broadcast from an external data center, and determine the type of the content being broadcast based on the information related to the acquired content. Furthermore, the controller 150 may determine the type of content based on user feedback input through a user interface device. For example, the user may input feedback information indicating that the content being broadcast is music by operating a dial provided in the head unit, and input feedback information indicating that the content being broadcast is voice or radio commercial.

The controller 150 may determine a reference level for switching the sound mode based on the type of content. When the type of content is music, the controller 150 may determine the reference level as the first reference level (303 and 304). When the type of content is voice or radio commercial, the controller 150 may determine the reference level as the second reference level higher than the first reference level (303 and 305). The reference level may be predetermined according to the type of content.

The controller 150 may detect the level of the FM broadcast signal (306) and determine the sound mode based on the reference level and the level of the FM broadcast signal (307). The level of the signal may mean a voltage value of the signal.

In detail, when the type of content is music, the controller 150 may determine a sound mode based on the first reference level and the level of the FM broadcast signal. When the level of the FM broadcast signal is equal to or lower than the first reference level, the controller 150 may determine the sound mode to mono (307, 308). Furthermore, when the level of the FM broadcast signal is greater than the first reference level, the controller 150 may determine the sound mode to stereo (307 and 309).

When the type of content is voice or radio commercial, the controller 150 may determine a sound mode based on the second reference level and the level of the FM broadcast signal. When the level of the FM broadcast signal is lower than or equal to the second reference level, the controller 150 may determine the sound mode to mono (307, 308). Furthermore, when the level of the FM broadcast signal is greater than the second reference level, the controller 150 may determine the sound mode to stereo (307 and 309).

The controller 150 may control the RF front end to modulate and demodulate the FM broadcast signal based on the determined sound mode. Furthermore, the controller 150 may control the speaker 140 based on the determined sound mode (310). In other words, the controller 150 may control the speaker to output sound waves corresponding to the signal in which the FM broadcast signal is modulated and demodulated to mono and may control the speaker 140 to output sound waves corresponding to the signal in which the FM broadcast signal is modulated and demodulated to stereo.

Figure 4:
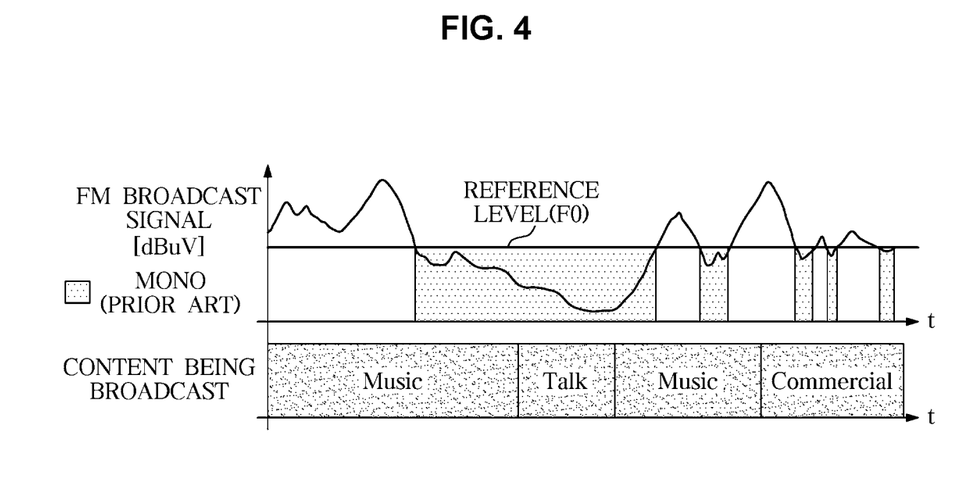
FIG. 4 is a graph showing that the related art switches the sound mode regardless of the type of content being broadcast.

FIG. 4 is a graph showing that the related art switches the sound mode regardless of the type of content being broadcast.

Referring to FIG. 4, the level of the FM broadcast signal is indicated using dBuV units. The related art switches the sound mode from stereo to mono when the level of the FM broadcast signal falls below a certain level (F0). This is because outputting in mono mode rather than stereo mode when the level of the broadcast signal is below a certain level is advantageous for securing SNR (Signal to Noise Ratio). For reference, stereo mode is more susceptible to propagation distortion than mono mode, so it is weak to noise and loses about 10% in terms of separation because it utilizes a partial superposition method.

As shown in FIG. 4, the related art switches the sound mode from stereo to mono as long as the level of the FM broadcast signal goes below a certain level F0 to remove background noise. That is, since the related art has switched the sound mode irrespective of the type of content being broadcast, there is a problem that the sense of space is removed more than necessary when the user is listening to music.

Figure 5:
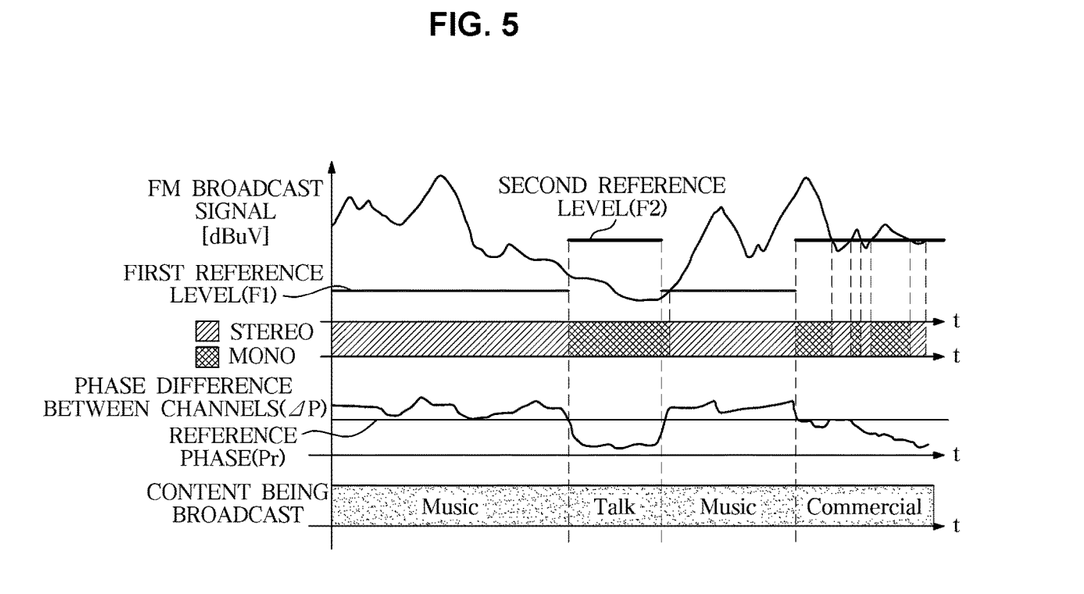
FIG. 5 is a graph illustrating that the vehicle infotainment apparatus switches the sound mode according to the type of content being broadcast.

FIG. 5 is a graph illustrating that the vehicle infotainment apparatus switches the sound mode according to the type of content being broadcast.

Referring to FIG. 5, the content of the FM broadcast that the user is listening to may change with time. For example, the FM broadcast may be transmitted in order of music, voice, music, and radio commercial. The vehicle infotainment apparatus 10 may receive and process an FM broadcast signal, and control the speaker 140 to output sound waves corresponding to the FM broadcast signal.

The controller 150 of the infotainment apparatus 10 may detect a phase difference Δp between the left L channel and the right R channel from the FM broadcast signal, and determine the type of content based on the phase difference Δp. The controller 150 may determine the type of content as music when the phase difference Δp is equal to or greater than the reference phase value Pr, and may determine the type of content as voice or radio commercial when the phase difference Δp is lower than the reference phase value Pr. Meanwhile, the reference phase value Pr may be a predetermined value or may be changed according to design. The infotainment apparatus 10 according to an exemplary embodiment of the present invention may determine the type of content by use of a phase difference Δp between the left (L) channel and the right (R) channel, so that an additional circuit is not required and an additional information does not need to be received over other channels.

The controller 150 may determine a reference level for switching the sound mode based on the type of content. The controller 150 may determine the reference level as the first reference level F1 when the type of content is music, and may determine the sound mode based on the first reference level F1 and the level of the FM broadcast signal. When the type of content is music, the controller 150 determines the sound mode to mono when the level of the FM broadcast signal is lower than or equal to the first reference level, and may determine the sound mode to stereo when the level of the FM broadcast signal is greater than the first reference level.

Furthermore, when the type of content is voice or radio commercial, the controller 150 determines the reference level as the second reference level F2 higher than the first reference level F1 and determine a sound mode based on the second reference level F2 and the level of the FM broadcast signal. The controller 150 may determine the sound mode to mono when the level of the FM broadcast signal is lower than or equal to the second reference level (F2), and determine the sound mode to stereo when the level of the FM broadcast signal is greater than the second reference level (F2).

As described above, according to the vehicle infotainment apparatus and the method for controlling the same, the reference level for switching the sound mode to mono may be actively changed according to the type of content.

In other words, when content including relatively little spatial information and sensitive to background noise such as voice or radio commercial is being broadcast, a reference level for switching the sound mode to mono may be set high. Therefore, the user may listen to a clean broadcast without noise.

On the other hand, when content including a lot of spatial information and insensitive to background noise such as music is being broadcast, a reference level for switching the sound mode to mono may be set low. That is, the section in which the sound mode is set to stereo becomes wider to further enhance the spatial sense of the sound.

Figure 6:
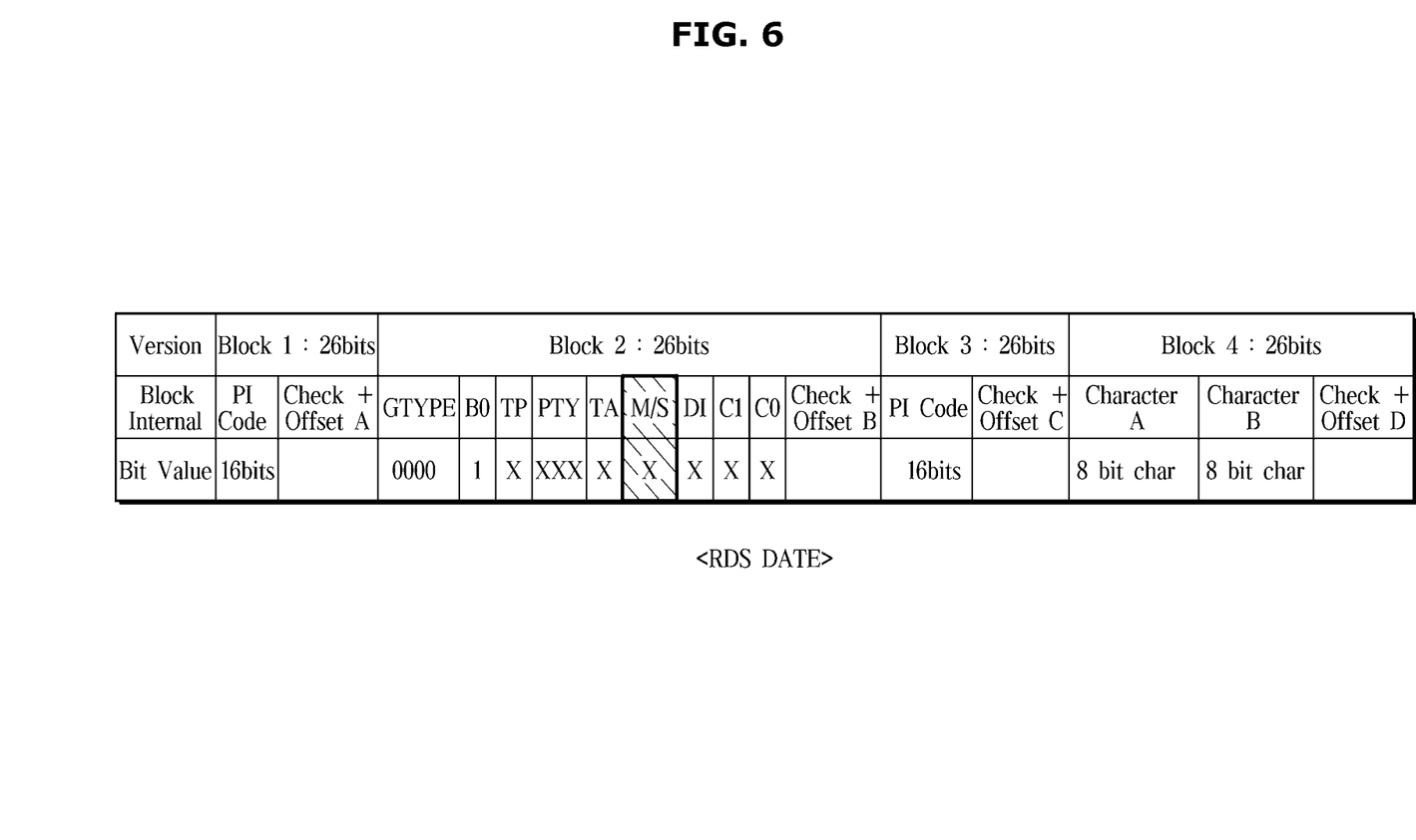
FIG. 6 shows the configuration of Radio Data System (RDS) data.

FIG. 6 shows the configuration of Radio Data System (RDS) data.

Auxiliary channel may be set in a high band such as 57 kHz, 67 kHz, 76 kHz, 92 kHz among the frequency bandwidth of the FM broadcast, and RDS data may be transmitted using the 57 kHz auxiliary channel.

Referring to FIG. 6, the RDS data includes four blocks of 26 bits each. Groups of RDS data are classified according to the Group Type Code (GTYPE) and Block Version (B0) values of Block 2. RDS data may be classified into a total of 32 groups (0A, 0B, 1A, 1B, . . . , 15A, 15B). Since the structure of the RDS data is well known, further description is omitted.

The controller 150 may determine the type of content based on Radio Data System (RDS) data received through the antenna 110. The controller 150 may decode the RDS data. In detail, the controller 150 may determine the type of content based on the M/S bit included in the RDS data. The M/S bit is contained in Group 0B of the RDS data. When the M/S bit is 1, the controller 150 may determine the type of content to music, and when the M/S bit is 0, the controller 150 may determine the type of content as voice or radio commercial.

The disclosed vehicle infotainment apparatus and a method for controlling the same may switch the sound mode to stereo or mono according to the type of content being broadcast.

The disclosed vehicle infotainment apparatus and a method for controlling the same can prevent the sound space from being removed more than necessary by appropriately switching the sound mode according to the type of content being broadcast, and provide a better listening experience to the user.

recording medium storing instructions that are executable by a computer. The instructions may be stored in a form of a program code, and when executed by a processor, the instructions may generate a program module to perform operations of the disclosed exemplary embodiments. The recording medium may be implemented as a computer-readable recording medium.

The computer-readable recording medium may include all kinds of recording media storing commands which may be interpreted by a computer. For example, the computer-readable recording medium may be ROM, RAM, a magnetic tape, a magnetic disc, flash memory, an optical data storage device, etc.

The exemplary embodiments of the present invention have thus far been described with reference to the accompanying drawings. It will be obvious to those of ordinary skill in the art that the present invention may be practiced in other forms than the exemplary embodiments as described above without changing the technical idea or essential features of the present invention. The above exemplary embodiments are only by way of example, and may not be interpreted in a limited sense.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle infotainment apparatus, comprising:
   an antenna configured to receive a FM broadcast signal;
   an RF front end connected to the antenna and configured to modulate and demodulate the received FM broadcast signal; and
   a controller connected to the RF front and configured to determine a type of content being broadcast by processing the received FM broadcast signal, determine a reference level for switching a sound mode based on the determined type of the content, determine the sound mode based on the reference level and a level of the received FM broadcast signal, and control the RF front end to modulate and demodulate the received FM broadcast signal based on the determined sound mode.

2. The vehicle infotainment apparatus of claim 1, wherein the controller is configured to determine the sound mode to stereo upon determining that the level of the received FM broadcast signal is greater than the reference level and determine the sound mode to mono upon determining that the level of the received FM broadcast signal is lower than or equal to the reference level.

3. The vehicle infotainment apparatus of claim 1, wherein the controller is configured to determine the reference level as a first reference level upon determining that the determined type of the content is music and determine the sound mode based on the first reference level and the level of the received FM broadcast signal.

4. The vehicle infotainment apparatus of claim 1, wherein the controller is configured to determine the reference level as a second reference level higher than a first reference level upon determining that the determined type of the content is voice or radio commercial and determine the sound mode based on the second reference level and the level of the received FM broadcast signal.

5. The vehicle infotainment apparatus of claim 1, wherein the controller is configured to detect a phase difference between a left channel and a right channel from the received FM broadcast signal and determine the type of the content based on the phase difference.

6. The vehicle infotainment apparatus of claim 5, wherein the controller is configured to determine the type of the content as music upon determining that the phase difference is equal to or greater than a reference phase value and determine the type of the content as voice or radio commercial upon determining that the phase difference is lower than the reference phase value.

7. The vehicle infotainment apparatus of claim 1, wherein the controller is configured to determine the type of the content based on Radio Data System (RDS) data received through the antenna.

8. The vehicle infotainment apparatus of claim 7, wherein the controller is configured to determine the type of the content based on M/S bit included in the RDS data.

9. The vehicle infotainment apparatus of claim 8, wherein the controller is configured to determine the type of the content as music upon determining that the M/S bit is 1 and determine the type of the content as voice or radio commercial upon determining that the M/S bit is 0.

10. The vehicle infotainment apparatus of claim 1, further including:
a transceiver connected to the controller and configured to communicate with an external data center,
wherein the controller is configured to acquire information related to the content being broadcast from the external data center.

11. The vehicle infotainment apparatus of claim 1, further including:
a user interface device,
wherein the controller connected to the user interface device is configured to determine the type of the content based on feedback of a user input through the user interface device.

12. The vehicle infotainment apparatus of claim 1, further including:
a memory configured to store broadcast information for each time corresponding to a FM broadcast frequency,
wherein the controller is configured to determine the type of the content based on the broadcast information for each time.

13. A method of controlling a vehicle infotainment apparatus, comprising:
receiving, by a controller of the vehicle infotainment apparatus, a FM broadcast signal using an antenna of the vehicle infotainment apparatus;
determining, by the controller, a type of content being broadcast by processing the received FM broadcast signal;
determining, by the controller, a reference level for switching a sound mode based on the determined type of the content;
determining, by the controller, the sound mode based on the reference level and a level of the received FM broadcast signal; and
controlling, by the controller, a RF front end of the vehicle infotainment apparatus and connected to the controller to modulate and demodulate the received FM broadcast signal based on the determined sound mode.

14. The method of claim 13, wherein the determining the sound mode includes:
determining the sound mode to stereo upon determining that the level of the received FM broadcast signal is greater than the reference level; and
determining the sound mode to mono upon determining that the level of the received FM broadcast signal is lower than or equal to the reference level.

15. The method of claim 13, wherein the determining the reference level includes:
determining the reference level as a first reference level upon determining that the type of the content is music,
wherein the determining the sound mode includes determining the sound mode based on the first reference level and the level of the received FM broadcast signal.

16. The method of claim 13, wherein the determining the reference level includes:
determining the reference level as a second reference level higher than a first reference level upon determining that the type of the content is voice or radio commercial,
wherein the determining the sound mode includes determining the sound mode based on the second reference level and the level of the received FM broadcast signal.

17. The method of claim 13, wherein the determining the type of the content includes:
detecting a phase difference between a left channel and a right channel from the received FM broadcast signal; and
determining the type of the content based on the phase difference.

18. The method of claim 17, wherein the determining the type of the content includes:
determining the type of the content as music upon determining that the phase difference is equal to or greater than a reference phase value; and
determining the type of the content as voice or radio commercial upon determining that the phase difference is lower than the reference phase value.

19. The method of claim 13, wherein the determining the type of the content includes:
determining the type of the content based on Radio Data System (RDS) data received through the antenna.

20. The method of claim 19, wherein the determining the type of the content includes:
determining the type of the content based on M/S bit included in the RDS data.

21. The method of claim 20, wherein the determining the type of the content includes:
determining the type of the content as music upon determining that the M/S bit is 1; and
determining the type of the content as voice or radio commercial upon determining that the M/S bit is 0.

22. The method of claim 13, further including:
acquiring information related to the content being broadcast from an external data center.

23. The method of claim 13, wherein the determining the type of the content includes:
   determining the type of the content based on feedback of a user input through a user interface device.

24. The method of claim 13, wherein the determining the type of the content includes:
   determining the type of the content based on the broadcast information for each time corresponding to a FM broadcast frequency stored in a memory of the vehicle infotainment apparatus.

* * * * *